(12) United States Patent
Hyuga et al.

(10) Patent No.: US 7,749,931 B2
(45) Date of Patent: Jul. 6, 2010

(54) CERAMIC OPTICAL PARTS AND PRODUCTION METHODS THEREOF

(75) Inventors: Hideki Hyuga, Nagoya (JP); Hideki Kita, Nagoya (JP); Tetsuya Yamazaki, Odawara (JP); Yasunori Tanaka, Saitama (JP)

(73) Assignees: FUJIFILM Corporation, Tokyo (JP); Fujinon Corporation, Saitama (JP)

( * ) Notice: Subject to any disclaimer, the term of this patent is extended or adjusted under 35 U.S.C. 154(b) by 0 days.

(21) Appl. No.: 11/705,490

(22) Filed: Feb. 13, 2007

(65) Prior Publication Data

US 2007/0191209 A1    Aug. 16, 2007

(30) Foreign Application Priority Data

Feb. 13, 2006    (JP)    ............................ 2006-035539

(51) Int. Cl.
  *C04B 35/563*  (2006.01)
  *C04B 35/565*  (2006.01)
  *C04B 35/582*  (2006.01)
  *C04B 35/584*  (2006.01)
  *C04B 35/599*  (2006.01)

(52) U.S. Cl. ............................ 501/88; 501/87; 501/90; 501/92; 501/97.1; 501/97.2; 501/96.4; 501/98.1; 501/98.2; 501/80

(58) Field of Classification Search .................... 501/80, 501/81, 82, 83, 84, 85, 97.1, 97.2, 97.3, 97.4, 501/87–92, 96.4, 98.7–98.3
See application file for complete search history.

(56) References Cited

U.S. PATENT DOCUMENTS

| | | | | |
|---|---|---|---|---|
| 5,219,802 A * | 6/1993 | Hsiao et al. | .................... | 501/81 |
| 5,928,601 A * | 7/1999 | Miyake et al. | .............. | 264/659 |
| 6,265,334 B1 * | 7/2001 | Sechi et al. | .................... | 501/9 |
| 6,800,360 B2 * | 10/2004 | Miyanaga et al. | ........... | 428/210 |
| 6,916,560 B2 * | 7/2005 | Wotting et al. | .............. | 428/698 |
| 7,041,366 B2 * | 5/2006 | Miyanaga et al. | ........ | 428/304.4 |
| 7,056,850 B2 * | 6/2006 | Komatsu | .................... | 501/97.2 |
| 7,067,085 B1 * | 6/2006 | Sugawara et al. | ........... | 264/676 |
| 7,112,549 B2 * | 9/2006 | Yoshitomi et al. | ........... | 501/128 |
| 7,160,825 B2 * | 1/2007 | Etoh et al. | ................. | 501/96.4 |
| 2004/0053769 A1 * | 3/2004 | Wotting et al. | ................. | 501/92 |
| 2006/0183625 A1 * | 8/2006 | Miyahara | ................... | 501/98.4 |

FOREIGN PATENT DOCUMENTS

| | | | |
|---|---|---|---|
| JP | 04050161 | * | 2/1992 |
| JP | 06172034 | * | 6/1994 |
| JP | 08310860 | * | 11/1996 |
| JP | 11-343168 A | | 12/1999 |
| JP | 2002-220277 A | | 8/2002 |
| WO | 03010113 | * | 2/2003 |
| WO | 03022780 | * | 3/2003 |

* cited by examiner

*Primary Examiner*—Karl E Group
(74) *Attorney, Agent, or Firm*—Sughrue Mion, PLLC

(57) ABSTRACT

A ceramic material for an optical member which shows black, wherein the ceramic material comprises a reaction-sintered sintered ceramic body prepared by synthesizing a formed body of a mixture comprising a ceramic raw material and a component that accelerates blackening, making use of a reaction sintering; and wherein the ceramic material is a porous body.

4 Claims, 4 Drawing Sheets

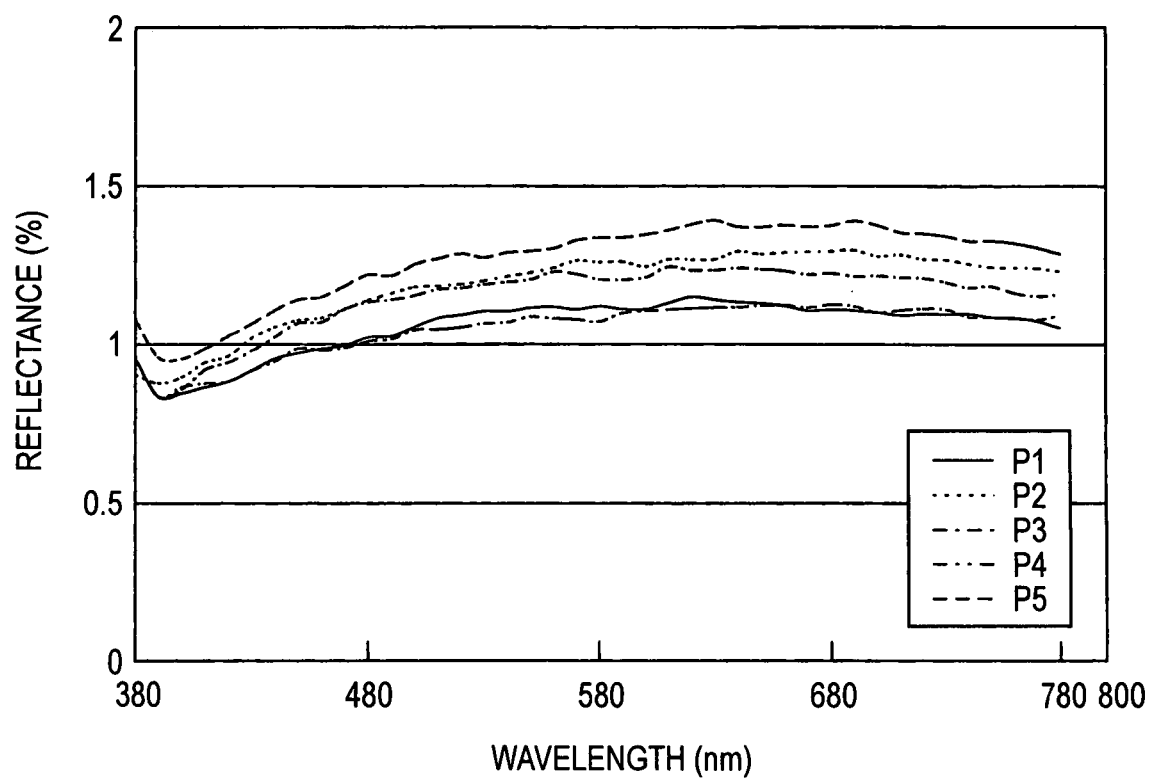

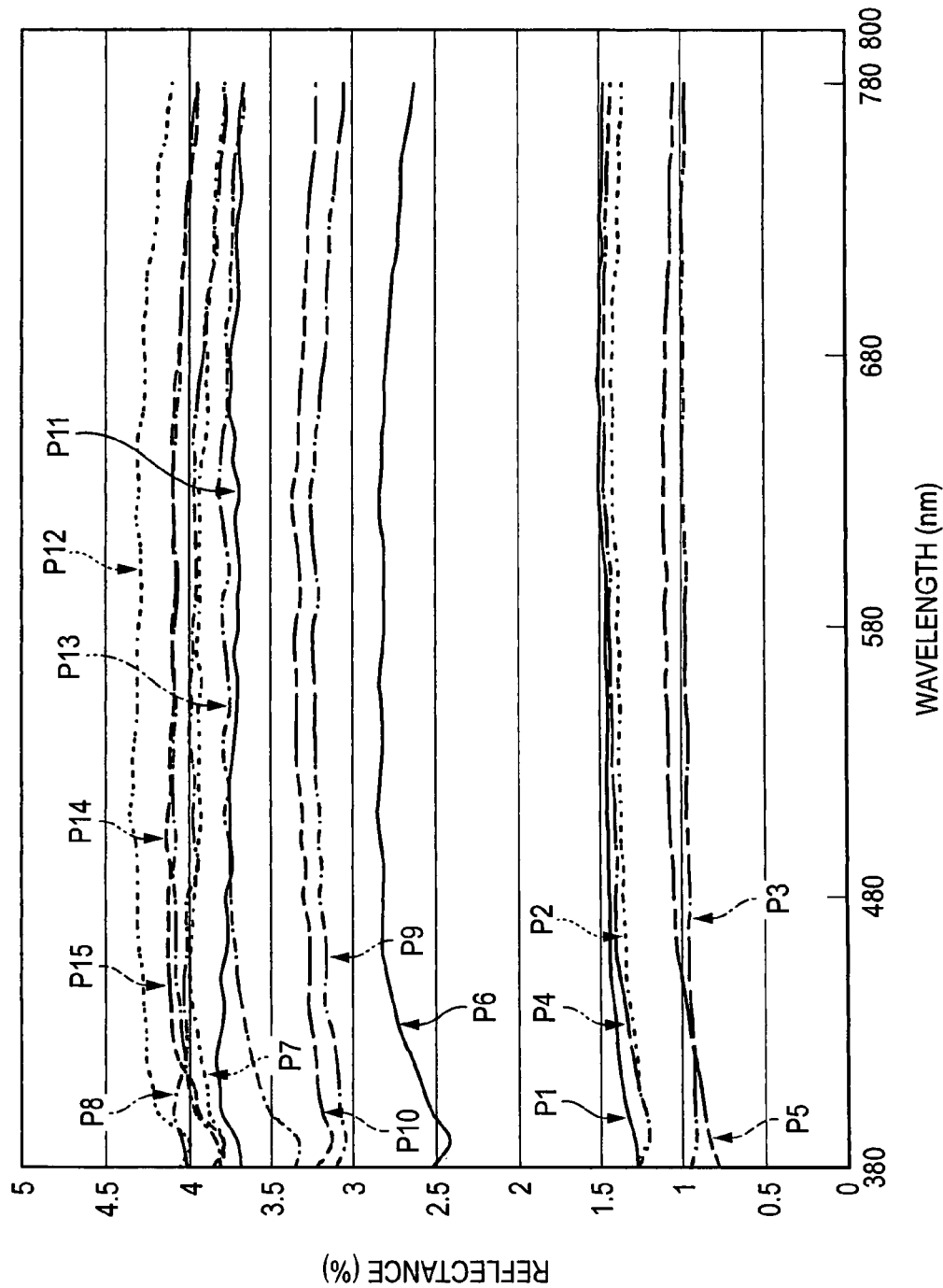

CERAMIC OPTICAL PARTS AND PRODUCTION METHODS THEREOF

BACKGROUND OF THE INVENTION

1. Field of the Invention

This invention relates to a ceramic material for an octal member, a production method thereof and a ceramic optical part, more particularly to a black and porous ceramic material which can be used in an octal part, a ceramic optical part and production methods thereof. The invention provides a novel ceramic material for an optical member, which is a ceramic material for an optical member constituted from a porous reaction-sintered sintered ceramic body that shows black, wherein it shows no variation regarding the accuracy of the sintered body, its reflectance at the visible light region is 20% or less, its surface is an unprocessed baked face and it can be suitably used as a high accuracy and high quality optical part, and provides new techniques and new product regarding ceramic optical parts.

2. Description of the Related Art

In a preceding reference, examples are reported for example on the use of a ceramic as an optical parts which has low thermal expansion and proper rigidity and abrasion resistance and shows black color, effected by Sposhmen or Cordierite (JP-A-2002-220277). Also, another preceding reference proposes a ceramic for optical members, which shows black color by containing, for example, Cordierite, as a base material, and carbon (JP-A-11-343168).

In addition, though not applications to optical members, there are reports on the inhibition of uneven color and the like at the time of sintering through the blackening of compact ceramics. However, in the case of compact ceramics, accuracy of the sintered body varies due to large shrinkage at the time of sintering, which results in the necessity to carry out a secondary processing and thereby poses a problem of increased cost or the like when, for example, this is used as an optical part for which high uniformity and high accuracy are required.

SUMMARY OF THE INVENTION

Under such a situation and by taking the aforementioned prior arts into consideration, the present inventors have carried out intensive studies with the aim of developing a ceramic material for an optical member use and product thereof which can be suitably used as a highly uniform and highly accurate optical part by its sintering alone without carrying out a secondary processing, and have succeeded as a result in developing a novel ceramic material that can be used as an optical part, making use of a ceramic porous body which is a reaction-sintered sintered ceramic body prepared by synthesizing it making use of a reaction sintering and has a predetermined porosity, thus resulting in the accomplishment of the invention. The invention aims at providing a novel ceramic material which can be suitably used as a highly accurate and highly uniform optical part by its sintering alone. In addition, another purpose of the invention is to provide a novel ceramic optical part in which entire or a portion of the part is constructed with a novel porous ceramic that can be sufficiently used as an optical part having small reflection at visible light region and high accuracy, making use of said ceramic material.

The invention for solving the aforementioned problems is composed of the following technical means.

(1) A ceramic material for an optical member which shows black, wherein the ceramic material comprises a reaction-sintered sintered ceramic body prepared by synthesizing a formed body of a mixture comprising a ceramic raw material and a component that accelerates blackening, making use of a reaction sintering; and wherein the ceramic (2) The ceramic material described in the aforementioned (1), wherein a reflectance of the ceramic material at visible light region is 20% or less.

(3) The ceramic material described in the aforementioned (1), wherein a maximum reflectance at visible light region of from 380 to 800 nm on any point of the ceramic material is 2% or less.

(4) The ceramic material described in the aforementioned (1), wherein a surface of the ceramic material is an unprocessed baked face.

(5) The ceramic material described in the aforementioned (1), wherein the porous body has a porosity of 10% or more.

(6) The ceramic material described in the aforementioned (1), which comprises at least one species of elements selected from Yb, Lu, Ce, Pr, Dy, Ho, Nb, W, Ta, Co, Cr, Mo, Hf, Ta, Zr, Ti, Fe, B and C.

(7) The ceramic material described in the aforementioned (1), which comprises a crystal phase of at least one of silicon nitride, SIALON, silicon carbide, boron carbide and boron nitride, and a complex thereof.

(8) The ceramic material described in the aforementioned (1), which comprises a crystal phase of at least one of alumina, zirconia and a complex thereof.

(9) The ceramic material described in the aforementioned (7) or (8), wherein volume ratio of the crystal phase contained in the ceramic material is within the range of from 60% to 98%.

(10) The ceramic material described in the aforementioned (7) or (9), wherein the crystal phase is formed by silicon nitride, SIALON, silicon carbide, boron carbide or a complex thereof, produced by a reaction sintering.

(11) A method for producing a ceramic material for an optical member which shows black, the method comprising: producing a body by forming a mixture prepared by adding a component capable of accelerating blackening to a ceramic raw material; and carrying out a reaction sintering by heating the obtained formed body, so as to prepare a reaction-sintered body.

(12) The method for producing a ceramic material described in the aforementioned (11), wherein a reflectance of the reaction-sintered body at a wavelength of from 380 to 800 nm as the visible light region is 20% or less.

(13) The method for producing a ceramic material described in the aforementioned (11), wherein a maximum reflectance at visible light region of from 380 to 800 nm on any point of the ceramic material is 2% or less.

(14) The method for producing a ceramic material described in the aforementioned (11), wherein the mixture comprises silicon and at least one species of elements selected from Yb, Lu, Ce, Pr, Dy, Ho, Nb, W, Ta, Co, Cr, Mo, Hf, Ta, Zr, Ti, Fe, B and C; and the obtained formed body is heated in an atmosphere of nitrogen to effect conversion of the silicon into its nitride.

(15) A ceramic optical part, entire or aportion of which comprises the ceramic material described in any one of the aforementioned (1) to (9).

BRIEF DESCRIPTION OF THE DRAWING

FIGS. 1A to 1D shows results of the measurement of reflection spectra of Inventive Example 1 (Sample 1), Inventive Example 2 and Comparative Examples 1 and 2 at the visible light region, respectively.

DETAILED DESCRIPTION OF THE INVENTION

Figure 1A:
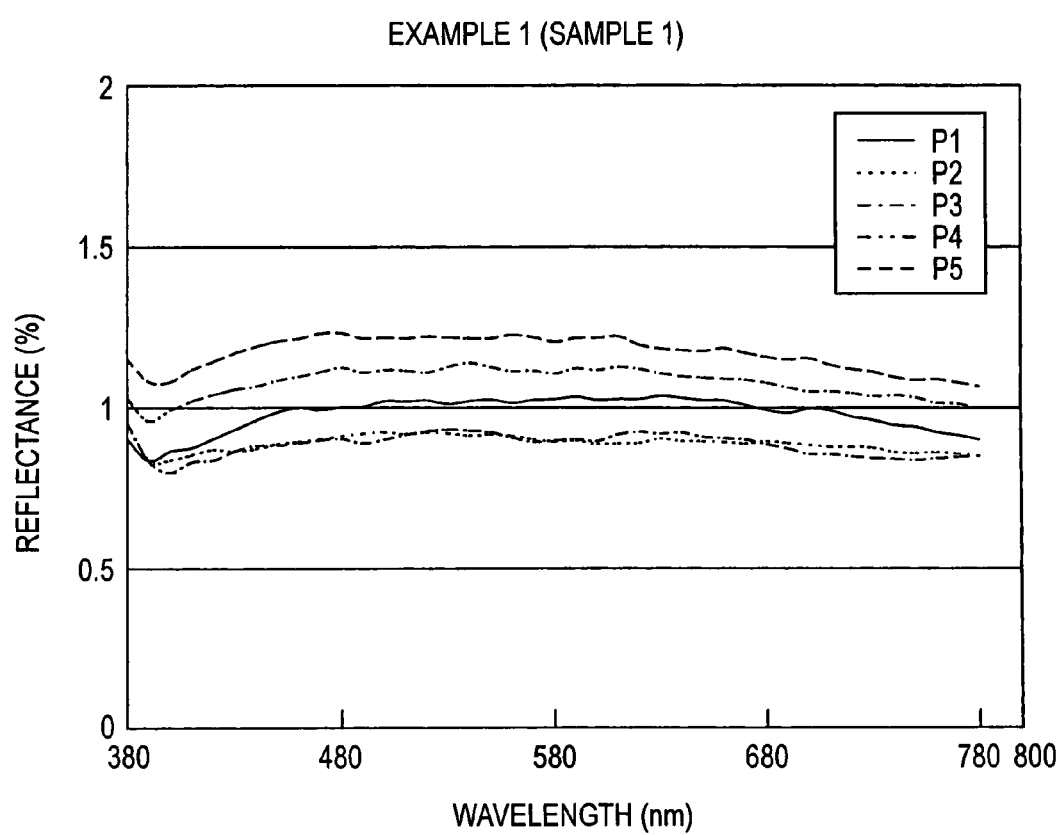

Next, the invention is described further in detail.

The invention is a ceramic material for an optical member which shows black, characterized in that (1) it comprises a reaction-sintered sintered ceramic body prepared by synthesizing a formed body of a mixture comprising a ceramic raw material and a component that accelerates blackening, making use of a reaction sintering, and (2) it is a porous body.

Preferred embodiments of the invention are that the aforementioned ceramic porous body is a porous body having a porosity of 10% or more, and that the aforementioned ceramic comprises at least one species or more of elements selected from Yb, Lu, Ce, Pr, Dy, Ho, Nb, W, Ta, Co, Cr, Mo, Hf, Ta, According to the invention, it is desirable that the aforementioned ceramic comprises a crystal phase of any one of silicon nitride, SIALON, silicon carbide, boron carbide and boron nitride, or a complex thereof, that the aforementioned ceramic comprises a crystal phase of alumina, zirconia or a complex thereof, that volume ratio of the crystal phase contained in the aforementioned ceramic is within the range of from 60% to 98%, and that the aforementioned crystal phase comprises silicon nitride, SIALON, silicon carbide, boron carbide or a complex thereof, produced by a reaction sintering.

The invention includes a method for producing a ceramic material for an optical member which shows black, characterized in that (1) a formed body is produced by forming a mixture prepared by adding a component capable of accelerating blackening to a ceramic raw material, (2) a reaction sintering is carried out by heating the thus obtained formed body. In a preferred embodiment of the method of the invention, it comprises a step of forming a mixture comprising silicon and at least one species or more of elements selected from Yb, Lu, Ce, Pr, Dy, Ho, Nb, W, Ta, Co, Cr, Mo, Hf, Ta, Zr, Ti, Fe, B and C, and a step of heating the thus obtained formed body in an atmosphere of nitrogen to effect conversion of the aforementioned silicon into its nitride. In addition, according to the invention, a ceramic optical part, characterized in that entire or a portion of a part is constituted making use of the aforementioned ceramic material, can be constructed.

According to the invention, composition of the aforementioned raw material powder, addition of the component which accelerates black color and its mixing method and means and the method and means for preparing a formed body by forming the mixture are not particularly limited, and optional methods and means can be used. As the forming method and means, for example, press molding, CIP molding, extrusion molding, injection molding and the like forming techniques can be suitably cited.

According to the invention, the ceramic obtained by adding the component capable of accelerating blackening to the raw material powder, mixing and forming them and then sintering said formed body, effected by employing the aforementioned means, is a porous ceramic which shows small shrinkage after sintering, has a small reflectance at a wavelength of from 380 to 800 nm (preferably from 380 to 780 nm) as the visible light region and is unprocessed, so that it can be suitably used as the ceramic material of ceramic optical parts. In detail, the invention can attain that a reflectance of the ceramic material at visible light region is 20% or less even if a baked face of the ceramic according to the invention is not unprocessed. Further, the invention can attain that a maximum reflectance at visible light region of from 380 to 800 nm (preferably from 380 to 780 nm) on any point of the ceramic material is 2% or less, even if a baked face of the ceramic according to the invention is not unprocessed.

On the producing method of the invention, it is preferable to add a component which accelerates blackening to a raw material powder such as silicon nitride, silicon carbide, boron carbide, alumina or zirconia, then keep the mixture at a temperature of lower than the general sintering temperature by a factor of from 300° C. to 500° C. and then reduce the temperature, thereby employing a sintering method intentionally restraining densification. With this sintering method, it is possible to obtain a porous ceramic material having small rate of shrinkage small reflection at visible light region. As the blackening-accelerating component which can be used in the invention, oxides, nitrides, borides and carbides comprising elements Yb, Lu, Ce, Pr, Dy, Ho, Nb, W, Ta, Co, Cr, Mo, Hf, Ta, Zr, Ti or Fe can be exemplified. In addition, in the case of silicon nitride or silicon carbide, addition of a compound containing B or C is also effective as the component which accelerates blackening.

According to the invention, the sintered body preferably contains the crystal phase of anyone of silicon nitride, SIALON, silicon carbide, boron carbide, boron nitride, alumina and zirconia or a complex thereof, and its volume ratio is preferably from 60% to 98%, while more than 98% is not preferable because reflection of visible light becomes large. Also, a case of smaller than 60% is not preferable because reduction of strength becomes significant.

In addition, desirably, the shrinkage at the time of sintering is further reduced, dimensional variation of the sintered body is inhibited and the cost of secondary processing is sharply reduced when a means for effecting formation of the crystal phase of silicon nitride, silicon carbide and SIALON or a complex thereof is used as the means for preparing the aforementioned ceramic, by carrying out the reaction sintering in an atmosphere of nitrogen using a raw material composition containing silicon in the starting material. In this case, it is desirable to carry out the nitriding spending a sufficient period of time at a sintering temperature of generally from 1,350° C. to 1,500° C. In the case of less than 1,350° C., the in situ reaction is not completed, and the strength tends to be also reduced sharply.

It is desirable to carry out the nitriding spending a sufficient period of time at a sintering temperature of generally from 1,350° C. to 1,500° C. In the case of less than 1,350° C., the in situ reaction is not completed, so that strength of the sintered body is reduced and the density itself is also reduced. In the case of a method in which silicon is used as the main material and converted into silicon nitride by carrying out its reaction sintering in an atmosphere of nitrogen, it is possible to optionally employ a method in which generation of heat accompanied by the nitriding is controlled In addition, when the reaction sintering is carried out in an atmosphere of nitrogen in the same manner, by using boron carbide as the main raw material and adding silicon thereto, silicon carbide and boron nitride are formed after the reaction sintering in an atmosphere of nitrogen, and the excessively added silicon becomes silicon nitride, effected by the addition of silicon to boron carbide.

According to the invention, it is realized to construct and provide a high accuracy ceramic material for an optical member, which shows small shrinkage after sintering, is porous, has a reflectance at the visible light region of 20% or less, consists of an unprocessed baked surface, can be used as a highly uniform and highly accurate optical part and shows black color, and a ceramic optical part in which entire or a portion of the part is constructed with said ceramic material, by carrying out a reaction sintering through heating of the formed body obtained by forming a mixture of a ceramic raw material prepared by adding and mixing a component which accelerates blackening, and then carrying out synthesis of the reaction-sintered ceramic sintered body by in situ reaction.

EXAMPLES

Next, the invention is illustratively described based on examples, but the invention is not restricted by the following examples.

Inventive Example 1

Blending weight ratios of the used raw material powders (compositions of mixed powders) are shown in Table 1. As the component which accelerates blackening, 15 wt % $Fe_2O_3$ was added to silicon powder. In the same manner, WB, $B_4C$, $MoO_3$, $Fe_3O_4$, $Ta_2O_5$, $ZrO_2$ or $Cr_2O_3$ was added at the aforementioned ratio. Each of these raw materials was weighed, mixed with 1.5 times in total powder weight of distilled water and a polyvinyl alcohol aqueous solution, mixed using a ball mill for about 6 hours to make a slurry and then subjected to spray drying to prepare granulated powder. Next, the granulated powder was put into a die of 20×80 mm in inner dimension, preformed under a pressure of 8.3 MPa, put into a nylon bag and then sealed therein by reducing the inside pressure.

TABLE 1

| Sample No. | Si | $Fe_2O_3$ | WB | $B_4C$ | $MoO_3$ | $Fe_3O_4$ | $Ta_2O_5$ | $ZrO_2$ | $Cr_2O_3$ |
|---|---|---|---|---|---|---|---|---|---|
| 1 | 85 | 15 | | | | | | | |
| 2 | 85 | | 15 | | | | | | |
| 3 | 85 | | | 15 | | | | | |
| 4 | 85 | | | | 15 | | | | |
| 5 | 85 | | | | | 15 | | | |
| 6 | 85 | | | | | | 15 | | |
| 7 | 85 | | | | | | | 15 | |
| 8 | 85 | | | | | | | | 15 |

This was pressurized using CIP under a pressure of 200 MPa to obtain a formed body. Subsequently, this was subjected to a degreasing treatment by heating it to 550° C. in an atmosphere of $N_2$ under 0.2 MPa and then to a reaction sintering by heating it to a maximum of 1,400° C. in an atmosphere of $N_2$ under 0.93 MPa. After the reaction sintering, measurement of reflectance on the sample surface at the visible light region was carried out. Namely, P1, P2, P3, P4 and P5 in FIG. 1A represent five arbitrary points of the sample 1 on Inventive Example 1, and reflectance on each of these points is measured and illustrated in FIG. 1A. The reflectance was measured by USPM-RU (produced by ORYMPUS ORPORATION) on Inventive Examples and Comparative Examples.

Inventive Example 2

Silicon carbide and carbon were weighed at a weight ratio of 6:4, and 15% $Fe_2O_3$ was added thereto. These weighed powders were mixed with 1.5 times in total powder weight of alcohol and a polyvinylbutyral alcohol solution, mixed using a ball until for about 6 hours to make a slurry and then subjected to spray drying to prepare granulated powder. Next, the granulated powder was put into a die of 20×80 mm in inner dimension, preformed under a pressure of 8.3 MPa, put into a nylon bag and then sealed therein by reducing the inside pressure.

This was pressurized using CIP under a pressure of 200 MPa to obtain a formed body. Subsequently, the thus obtained formed body was put into a crucible of boron nitride spread with silicon, and then heated to 1,500° C. in an atmosphere of Ar under 0.1 MPa to carry out its reaction sintering. After the reaction sintering measurement of reflectance on the sample surface at the visible light region was carried out. Namely, P1, P2, P3, P4 and P5 in FIG. 1B represent five arbitrary points of the sample on Inventive Example 2, and reflectance on each of these points is measured and illustrated in FIG. 1B.

Inventive Example 3

As the components which accelerate blackening, 2% $MoO_3$, 2% $Fe_2O_3$ and 2% $Cr_2O_3$ were added to respective raw materials alumina and zirconia, and these raw materials were weighed, mixed with 1.5 times in total powder weight of distilled water and a polyvinylalcohol aqueous solution, mixed using a ball mill for about 6 hours to make a slurry and then subjected to spray drying to prepare granulated powder.

Next, the granulated powder was put into a die of 20×80 mm in inner dimension, preformed under a pressure of 8.3 MPa, put into a nylon bag and then sealed therein by reducing the inside pressure. This was pressurized using a CIP device under a pressure of 200 MPa to obtain a formed body. Subsequently, the thus obtained formed body was subjected to a degreasing treatment by heating it to 550° C. in an atmosphere of $N_2$ under 0.2 MPa, and then to a reaction sintering at 1,250° C. for 1 hour in an atmosphere of $N_2$ under 0.1 MPa.

After the sintering, measurement of reflectance on the sample surface at the visible light region was carried out.

Comparative Example 1

Reflectance of a black polystyrene lens-barrel part (dull surface) actually used as a camera part was measured. Namely, P1 to P15 in FIG. 1C represent fifteen arbitrary points of the sample on Comparative Example 1, and reflectance on each of these points is measured and illustrated in FIG. 1C.

Comparative Example 2

Figure 1D:
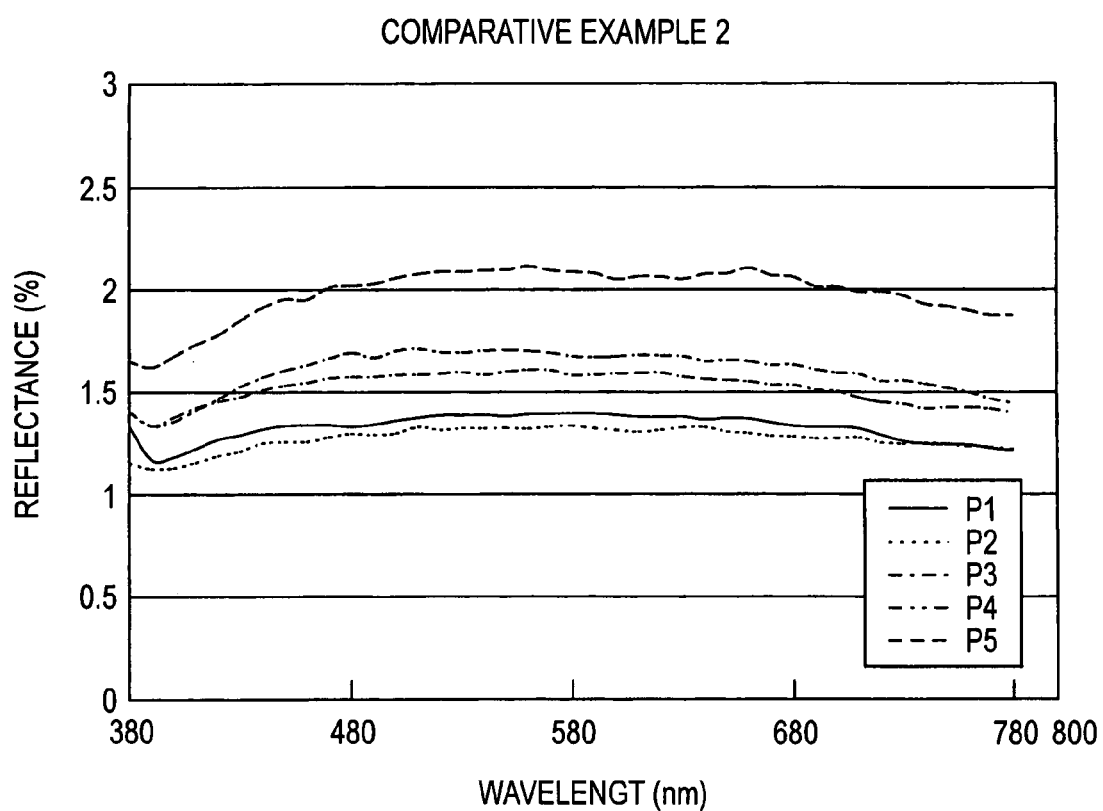

Silicon nitride powder was mixed with 5% by weight of $Al_2O_3$ and 5% by weight of $Y_2O_3$, and the resulting mixture was mixed with 1.5 times in total powder weight of alcohol and a polyvinylbutyral alcohol solution, mixed using a ball mill for about 6 hours to make a slurry and then subjected to spray drying to prepare granulated powder. Next, the granulated powder was put into a die of 20×80 mm in inner dimension, preformed under a pressure of 8.3 MPa, put into a nylon bag and then sealed therein by reducing the inside pressure. This was pressurized under a pressure of 200 MPa using a CIP device to obtain a formed body. The thus obtained formed body was put on silicon nitride powder in a graphite crucible and sintered at 1,850° C. The measured results for reflectance are shown in FIG. 1D. Namely, P1, P2, P3, P4 and P5 in FIG. 1D represent five arbitrary points of the sample on Comparative Example 2, and reflectance on each of these points is measured and illustrated in FIG. 1D.

Comparison of the Results of the Aforementioned Inventive Examples 1 to 3 and Comparative Examples 1 and 2

When dimensions of the thus obtained sintered bodies were measured, the formed bodies of Inventive Examples 1 and 2 showed a markedly small dimensional change of within ±1%, thus revealing that they can be easily controlled in producing precision parts. In addition, the sintered body of Inventive Example 3 also showed an evidently small dimensional change of within −5%, when compared with a case of obtaining general compact bodies. FIGS. 1A to 1D show results of the measurement of reflectance of the sample prepared in Inventive Example 1 (Sample 1) and the samples of Comparative Examples 1 and 2. Although the result on only the sample 1 in the Inventive Example 1 is illustrated, when compared with the silicon nitride ceramic prepared in Comparative Example 2, it was confirmed that all of the samples (samples 1 to 8) prepared in Inventive Example 1 have small reflectance. As seen in FIG. 1A, a maximum reflectance at visible light region on any point of the sample 1 in Inventive Example 1 was 2% or less.

It was confirmed that all of the samples (samples 1 to 8) prepared in Inventive Example 1 also have smaller reflectance when compared with the reflectance at the visible light region of the black polystyrene lens-barrel part measured in Comparative Example 1. In the same manner, in the case of the results of the reflectance measurement of the sample prepared in Inventive Example 2, it was confirmed that its reflectance was also evidently small in comparison with Comparative Examples 1 and 2. As seen in FIG. 1B, a maximum reflectance at visible light region on any point of the sample in Inventive Example 2 was 2% or less. In addition, strength of each of the sintered bodies prepared in Inventive Examples 1 and 2 was from 160 MPa to 200 MPa, thus confirming that they have the strength similar to or larger than those of the plastics and plastic matrix composites which are conventionally used as lens-barrel parts, and therefore have no problems in using them as optical parts.

The following effects are exerted by the invention. (1) A novel ceramic material for optical member, which has small reflection at the visible light region, is porous and shows black color, and can be used suitably as a high accuracy optical part by sintering alone, can be provided by the invention.

(2) A ceramic optical part, in which entire or a portion of the part is constructed making use of the aforementioned ceramic material for optical member, can be provided by the invention.

(3) A method for producing the aforementioned ceramic material for optical member can be provided by the invention, which renders possible preparation of the ceramic material for optical member having the aforementioned characteristics with low cost, high efficiency and high accuracy without requiring a secondary processing, making use of an in situ reaction.

(4) The invention renders possible provision of a novel ceramic material for optical member, which can be applied suitably to an optical part that particularly requires high uniformity, high accuracy and high precision level, and of a high accuracy, high quality ceramic optical part constituted from said ceramic material.

(5) The ceramic material of the invention for optical member use has excellent characteristics in terms of its dimensional accuracy, low reflection ratio and strength, which are equal to or higher than those of the black polystyrene and the like plastics and plastic matrix composites conventionally and actually used as camera part materials, so that it is possible to use this as their substitutive materials and substitutive products.

(6) The use of the ceramic optical part of the invention renders possible provision of low environmental loading type optical products.

As has been described in detail, the invention relates to a ceramic material for optical member use and a ceramic optical part, and according to the invention, it becomes possible to provide a ceramic material for optical member use which can be used as an optical part with high accuracy by its sintering alone, a production method thereof and a ceramic optical part. The invention has a high technical significance, because it can realize provision of new techniques and new products regarding a novel ceramic material for an optical member use which has high dimensional accuracy, small reflectance at the visible light region and high strength, a novel ceramic optical part in which entire or a portion of the part is constructed making use of said ceramic material and a new low environmental loading type optical product which uses said ceramic optical part.

The entire disclosure of each and every foreign patent application from which the benefit of foreign priority has been claimed in the present application is incorporated herein by reference, as if fully set forth.

What is claimed is:

1. A ceramic material for an optical member which shows black,
wherein the ceramic material comprises a reaction-sintered sintered ceramic body prepared by synthesizing a formed body of a mixture comprising a ceramic raw material and a component that accelerates blackening, making use of a reaction sintering;
wherein the ceramic material is a porous body having a porosity of 10% or more,
the component that accelerates blackening is present in an amount of from 6 to 15 wt %,
the maximum reflectance in the visible light region of from 380 to 800 nm on any point of the ceramic material is 2% or less, and
the dimensions of the sintered ceramic body are within ±1% with respect to the dimensions of the formed body, and
wherein the ceramic material comprises:
at least one species of elements selected from Lu, Ce, Pr, Dy, Ho, Nb, W, Ta, Co, Cr, Mo, Hf, Ta, Zr, Ti, Fe, B and C as the blackening-accelerant component; and
a crystal phase of at least one of silicon nitride, SIALON, silicon carbide, boron carbide and boron nitride, and a complex thereof.

2. The ceramic material described in claim 1, wherein the volume ratio of the crystal phase contained in the ceramic material is within the range of from 60% to 98%.

3. The ceramic material described in claim 1,
wherein the crystal phase is formed by silicon nitride, SIALON, silicon carbide or a complex thereof, produced by a reaction sintering.

4. A ceramic optical part, the entirety or a portion of which comprises the ceramic material described in claim 1.

* * * * *